United States Patent [19]
Tsujioka et al.

[11] Patent Number: 5,889,751
[45] Date of Patent: Mar. 30, 1999

[54] METHOD FOR OPTICALLY CONTROLLING AN OPTICAL DEVICE AND AN OPTICAL CONTROL DEVICE UTILIZING THE METHOD

[75] Inventors: Tsuyoshi Tsujioka, Osaka; Minoru Kume, Shijyounawate; Masahiro Irie, 24-25-706, Muromi 4-chome, Sawara-ku, Fukuoka-city, 814, all of Japan

[73] Assignees: Sanyo Electric Co. Ltd., Osaka; Masahiro Irie, Fukuoka, both of Japan

[21] Appl. No.: 881,130

[22] Filed: Jun. 24, 1997

[30] Foreign Application Priority Data

Jun. 24, 1996 [JP] Japan .................................. 8-163367

[51] Int. Cl.⁶ .................................................. G11B 7/125
[52] U.S. Cl. ........................................ 369/116; 369/121
[58] Field of Search ..................................... 369/116, 121, 369/283, 284, 285, 288; 372/22, 45, 46, 50; 428/64.1, 64.2, 64.8, 913; 430/495, 945

[56] References Cited

U.S. PATENT DOCUMENTS

| | | | |
|---|---|---|---|
| 5,088,086 | 2/1992 | Van et al. ................................ | 369/284 |
| 5,177,752 | 1/1993 | Ohya et al. .............................. | 372/46 |
| 5,234,799 | 8/1993 | Nagae et al. ............................. | 430/495 |
| 5,592,501 | 1/1997 | Edmond et al. .......................... | 372/45 |
| 5,604,002 | 2/1997 | Tsujioka et al. ......................... | 369/283 |
| 5,605,779 | 2/1997 | Irie et al. ................................ | 369/284 |
| 5,727,008 | 3/1998 | Koga ........................................ | 372/43 |

FOREIGN PATENT DOCUMENTS 5-225611  9/1993  Japan .
8-036787  2/1996  Japan .

OTHER PUBLICATIONS

"Symposium on Optical Memory 1994," Jul. 11–13, 1994, International Conference Center, Waseda University, Tokyo, Japan.

"Full–Color Fluorescent Display Devices Using a Near–UV Light–Emitting Diode," Japan J. Appl. Phys. vol. 35 (1995), pp. L838–L839, Part 2, No. 7A, 1 Jul. 1996.

*Primary Examiner*—Tod R. Swann
*Assistant Examiner*—Kim-Kwok Chu
*Attorney, Agent, or Firm*—Nikaido Marmelstein Murray & Oram, LLP

[57] ABSTRACT

A photon mode reaction is caused in an optical recording medium by irradiating the optical recording medium susceptible to the photon mode reaction with light emitted from a light emitting device when driven by a pulsed current.

25 Claims, 10 Drawing Sheets

REPRODUCING SIGNALS

METHOD FOR OPTICALLY CONTROLLING AN OPTICAL DEVICE AND AN OPTICAL CONTROL DEVICE UTILIZING THE METHOD

BACKGROUND OF THE INVENTION

1. Field of the Invention

The present invention relates to a method for optically controlling optical devices such as optical recording media utilizing photochromic materials and the like, and to an optical control device utilizing such a method.

2. Description of Related Art

In recent years, extensive studies on photochromism have been made to investigate its applicability to optical information processing and recording. An attempt has been made to apply photochromic materials to a recording layer of an optical recording medium. Another attempt has been directed to provide a high density optical disk through a super resolution effect utilizing a photochromic masking layer.

In optical devices utilizing such a photochromic material, the photochromic material experiences a photon mode reaction upon irradiation with light. Typical light sources include semiconductor lasers and light-emitting diodes which are small in size and low in cost.

It is often required to irradiate the photochromic material with ultraviolet light if the photochromic material is to be colored to exhibit an increased absorption in a visible light region. However, currently available, short-wavelength light emitting devices provide an emitting light in a wavelength range from violet to blue. The coloring of the photochromic material by exposing them to ultraviolet light emitted directly from those semiconductor lasers or light emitting diodes has not been accomplished to this date.

SUMMARY OF THE INVENTION

It is an object of the present invention to provide a method for optically controlling an optical device that utilizes a photon mode reaction such as of photochromic materials wherein the light emitting device such as semiconductor laser or light emitting diode is employed to produce a light in conventionally unemployed wavelength ranges, e.g. an ultraviolet light, and provide an optical control device utilizing such a method.

A characteristic feature of the present method for optically controlling an optical device resides in its utilization of the light emitting device which, when driven by a relatively high pulsed current, emits a light having a wavelength different from that of a light emitted from the device when driven by a relatively low constant current, for causing a photochromic reaction, such as a photon mode reaction in the optical device upon irradiation with the light emitted from the light emitting device when driven by the relatively high pulsed current.

A higher level of current can be given to the light emitting device when it is driven by the pulsed current than when driven by the constant current. This follows that a particular light emitting device, when driven by the pulsed current, emit a light having a wavelength different from that of light emitted from the device when driven by the constant current. The light emitting devices generally show a trend of emitting a light having a shorter wavelength when driven by the pulsed current than when driven by the constant current. A particular class of light emitting devices accordingly shows the ability to emit an ultraviolet light when driven by the pulsed current. Such light emitting devices include the light emitting diodes having an active layer comprised of a compound containing at least gallium and nitrogen such as a GaN-based compound.

Illustrative of the optical devices which experience the photochromic reaction such as the photon mode reaction are those containing the photochromic material. Such optical devices include optical recording media. One class of optical recording media contains the photochromic material in a recording layer thereof. Another class of optical recording media contains the photochromic material in a masking layer thereof for attaining a super resolution effect that produces an effective spot smaller than an irradiation spot.

In irradiating the optical recording medium containing the photochromic material in its recording or masking layer with a light spot emitted from the above light emitting device, the light spot is moved relative to the optical recording medium for scanning thereof over the optical recording medium. In this instance, the frequency of the pulsed current for driving the light emitting device is preferably higher than determined by a ratio of a rate of relative movement of the optical recording medium to a spot radius of the emitting light, more preferably not lower than twice the determined value. As used herein, the term "spot radius" refers to a spot radius that spans in the direction of the relative motion of the emitting light spot. Where a plurality of emitting light spots are present, the smallest in radius among those spots is selected as a standard. Setting the pulsed current at the above-specified frequency is effective in preventing nonuniform irradiation of the optical recording medium with a pulsed emitting light. That is, the production of non-irradiated portions on a track can be prevented.

In the present invention, the light emitting device is driven by the pulsed current. Such a pulsed drive current is able to generate reduced heat and prevent destruction of the device such as by heat. In order to further improve its protective effect against the destruction such as by heat, it is desirable to set a duty ratio of the drive pulses at not higher than 1/10, more preferably not higher than 1/100.

As described above, the ultraviolet light is frequently used to irradiate the photochromic material for its change to a colored state in which the photochromic material shows a high absorption in a visible region. In the present invention, the ultraviolet light emission from the light emitting device can be accomplished by utilizing the pulsed current in driving the light emitting device. Illustrative of such light emitting devices that emit the ultraviolet light when driven by the pulsed current are GaN-based light emitting diodes (LED). These are LEDs having an active layer comprised of III–V compounds, typically of Ga and N, and include super luminescent diodes. Also illustrative thereof are the LEDs having an active layer comprised of III–V compounds such as InGaN.

A reproducing apparatus for the optical recording medium in accordance with the present invention functions to reproduce information stored in the optical recording medium having a photochromic material-containing layer which, upon irradiation with the ultraviolet light, exhibits increased absorption at a frequency of a reproducing light. The reproducing apparatus includes a light emitting device for emitting the ultraviolet light when driven by the pulsed current to increase the absorption of the photochromic material-containing layer at the frequency of the reproducing light upon irradiation therewith. The reproducing apparatus further includes means for supplying the pulsed current to the light emitting device, a reproducing light source which emits the reproducing light for reproducing information stored in the recording medium and for reducing the previously increased absorption of the photochromic material-containing layer at the frequency of the reproducing light, means for gathering the reproducing light emitted from the reproducing light source to direct it onto the optical recording medium, and means for detecting the reproducing light from the optical recording medium.

In general, the photochromic material-containing layer constitutes the recording or masking layer of the optical recording medium. In the case where the photochromic material-containing layer constitutes the masking layer, a recording mode of the optical recording medium is not particularly restrictive and any recording mode can be employed which is also applicable to optical recording media utilizing the photochromic materials, magneto-optical recording media, rewritable optical recording media such as phase change type media, write once optical recording media, or reproduce only optical recording media such as CD.

The masking layer may be positioned closer to or remoter from an optical input side of the optical recording medium relative to the recording layer.

The reproducing apparatus for the optical recording medium in accordance with the present invention utilizes the small and cost-effective light emitting device for emission of the ultraviolet light to result in reduction in size and cost of the reproducing apparatus.

The optical control device in accordance with the present invention has an optical portion including the photochromic material reversibly changeable between a first state and a second state. The device further has a light emitting device for irradiating the optical portion which, when driven by a relatively higher pulsed current, emits a light having a wavelength different from that of a light emitted therefrom when driven by a relatively lower constant current, and a drive means for driving the light emitting device which selectively supplies to the light emitting device either the pulsed or constant current responsive to signals from external. The driving means is selectively operated to either apply the pulsed current to the light emitting device for irradiating the optical portion with the light from the pulse driven light emitting device so that the optical portion changes from the first state to the second state, or apply the constant current to the light emitting device for irradiating the optical portion with the light from the constant current driven light emitting device so that the optical portion changes from the second state to the first state.

In accordance with the optical control device of the present invention, a single light emitting device is utilized to emit two types of lights having wavelengths different from each other so that the state change of the photochromic material between the first and second states can be caused by irradiation thereof with either of the two types of lights emitted from the single emitting device. This optical control device can be employed as alternatives to conventionally known optical devices such as optical switches and the like, and is capable of providing an optical control measure which is small in size and low in cost and power consumption.

Any optical emitting device analogous to those used in the above-described method of the present invention for optically controlling optical devices can be employed as the optical emitting device for use in the optical control device of the present invention.

In accordance with the present method for optically controlling optical devices, such light-emitting devices as semiconductor lasers or light emitting diodes can be utilized to produce the light in a conventionally unused wavelength range including ultraviolet light. Also, the optical control device of the present invention is capable of optically controlling the optical portion by using the single light source. This results in reduction thereof in size, cost and power consumption.

DESCRIPTION OF PREFERRED EMBODIMENTS

Figure 2:
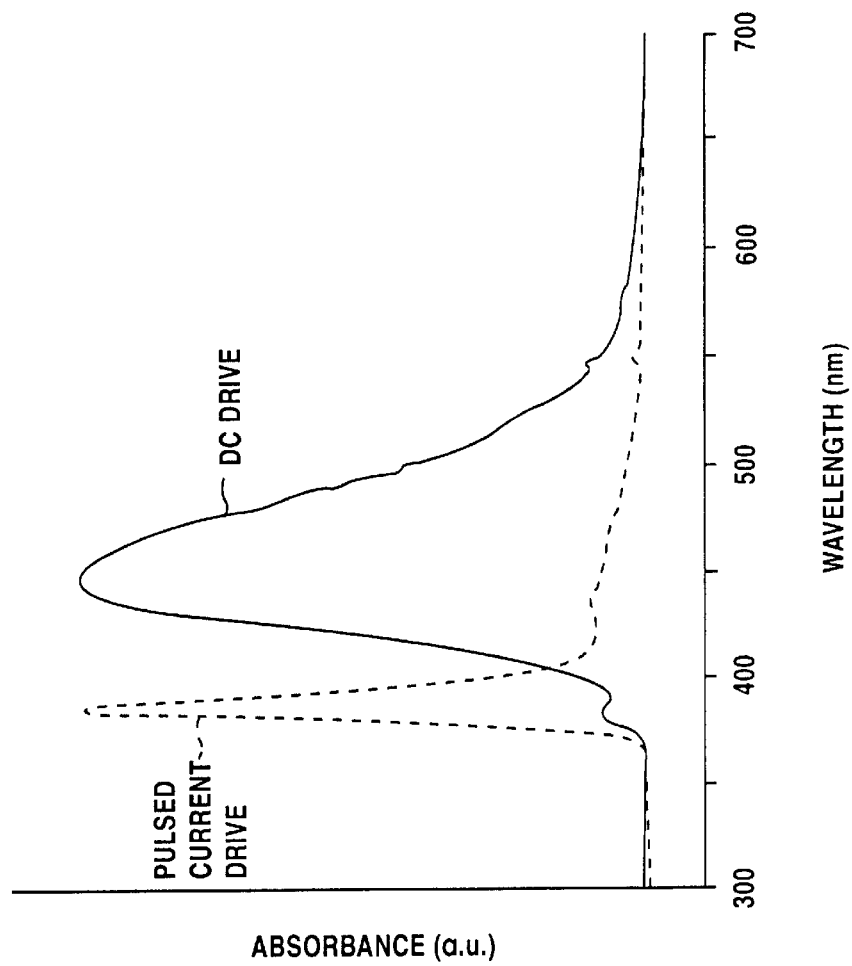
FIG. 2 shows an emission spectrum when the GaN-based LED is driven by the pulsed current and DC.

FIG. 2 shows a spectrum of the lights emitted from a commercially available GaN-based LED (double hetero structure; blue LED "NLPB500" manufactured by Nichia Chemical Ind., Ltd.) when driven by a pulsed current and a constant current, respectively. The pulsed current drive was effected with a frequency of 2 kHz, a peak current of 400 mA, and a duty ratio of 1/20. The constant current drive (DC drive) was effected at a constant current of 20 mA. As apparent from FIG. 2, the LED when driven by DC emits a light having a peak in a wavelength range of 440–460 nm within a visible light region, and the LED when driven by the pulsed current emits an ultraviolet light having a peak in a wavelength range of 360–390 nm.

Figure 3:
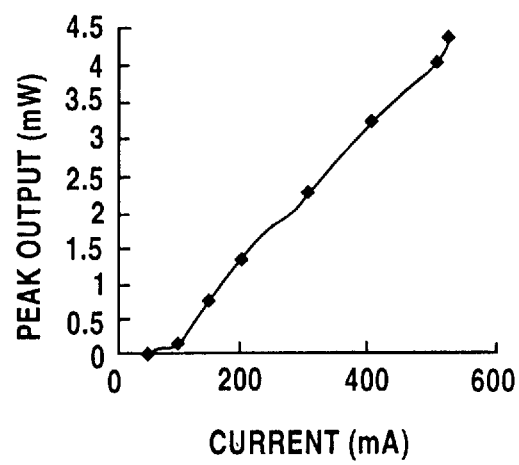
FIG. 3 is a graph showing the current-output characteristics of the GaN-based LED when driven by the pulsed current.

FIG. 3 is a graph showing the current-output characteristics of the LED when driven by the pulsed current. The frequency and duty ratio of the pulsed current employed were 2 kHz and 1/100, respectively. As can be appreciated from FIG. 3, as a peak of the pulse driven current exceeds 100 mA, a rapid increase in intensity of the emitting light is caused. The output showed no trend of saturating even when the peak current reached 2 A. As shown in FIG. 2, the emission spectrum of the LED is weak in the visible light region and intense at 360–390 nm in the ultraviolet region.

Figure 4:
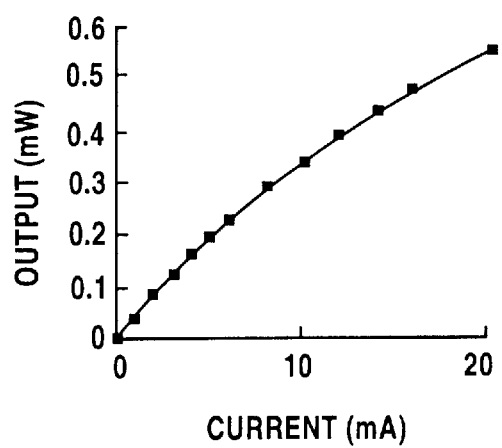
FIG. 4 is a graph showing the current-output characteristics of the GaN-based LED when DC driven.

FIG. 4 is a graph showing the current-output characteristics of the LED when DC driven. As can be seen from FIG. 4, the emission intensity of the DC driven LED increases at a slower rate as the drive current increases, and reaches to a saturation around 100 mA. Further increase of the current level to 200 mA or higher causes a drop in output. The emission spectrum has a significant wavelength spread in the visible light region with a broad peak around 450 nm. The LED was destroyed in a short period after the current level was increased to 200 mA or higher.

Then, the ultraviolet light emitted from the pulse driven GaN-based LED was directed upon a sample of diarylethene-group photochromic material as represented by the following formula (1). The photochromic material used is a compound which shows no change in color upon irradiation with the visible light. In other words, the irradiation with the visible light causes little absorption in the visible light region while the irradiation with ultraviolet light (at 300 nm–400 nm) causes a photon mode coloring reaction in the photochromic material. The photochromic material sample employed was prepared by adding 1 weight % of the photochromic material to polystyrene, dissolving the mixture in toluene, and casting the resulting solution on a glass disk to form a thin film.

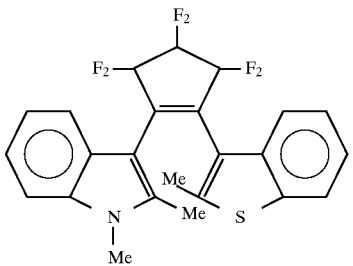
(1)

The polymer thin film sample thus prepared was irradiated with a light emitted from the GaN-based LED when driven by the pulsed current at a frequency of 2 kHz, a peak current of 1 A, and a duty ratio of 1/100 (pulse width of 5 μs). For comparative purposes, another sample was irradiated with a light emitted from the DC driven GaN-based LED. In this instance, the DC drive was effected at a constant current of 20 mA.

Figure 5:
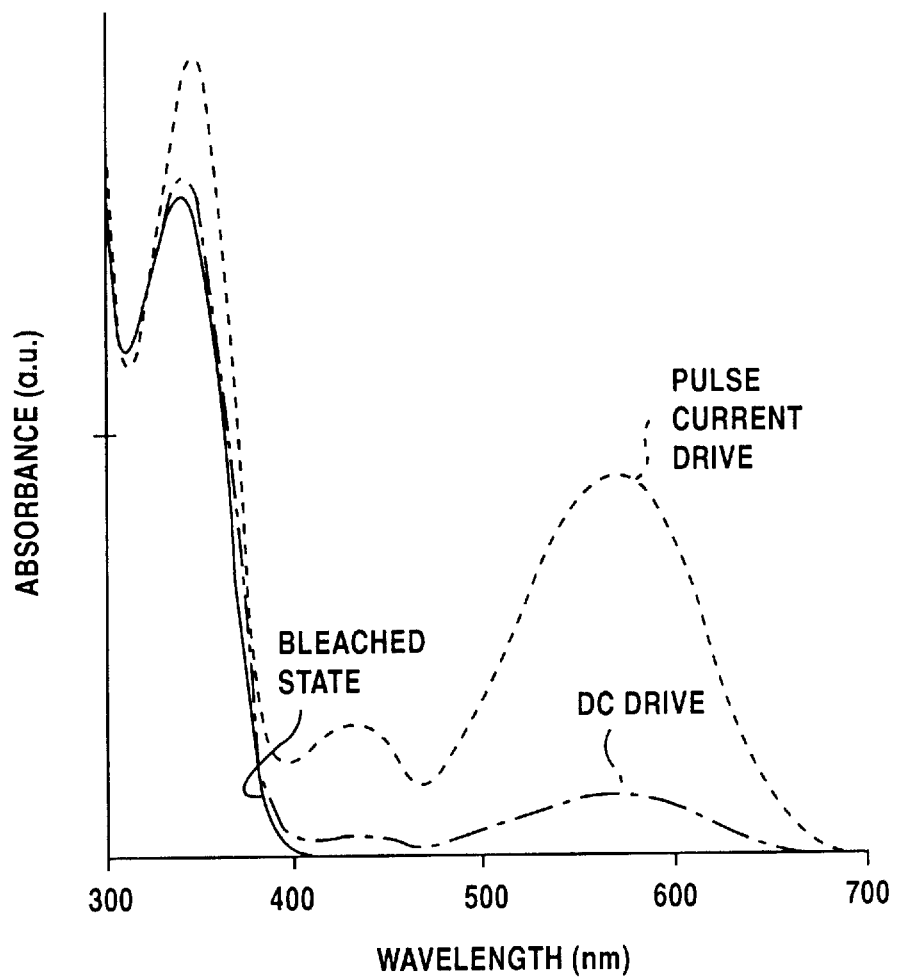
FIG. 5 shows an absorption spectrum of the photochromic material after irradiated with the pulse- and DC-driven LED.

FIG. 5 is a graph showing an absorption spectrum of the sample when irradiated with the light emitted from the above-described pulse driven LED while in its discolored or bleached state, and an absorption spectrum of the same sample when sequentially irradiated with the light emitted from the DC driven LED. FIG. 5 further shows an absorption spectrum of the sample maintained in its bleached state for reference. As can be appreciated from FIG. 5, an intense absorption, indicative of coloring, appears in the visible light region when the sample was irradiated with the light emitted from the pulse driven LED. Also, the subsequent irradiation of the colored sample with the light emitted from the DC driven LED is observed to produce a discoloring effect.

Figure 6:
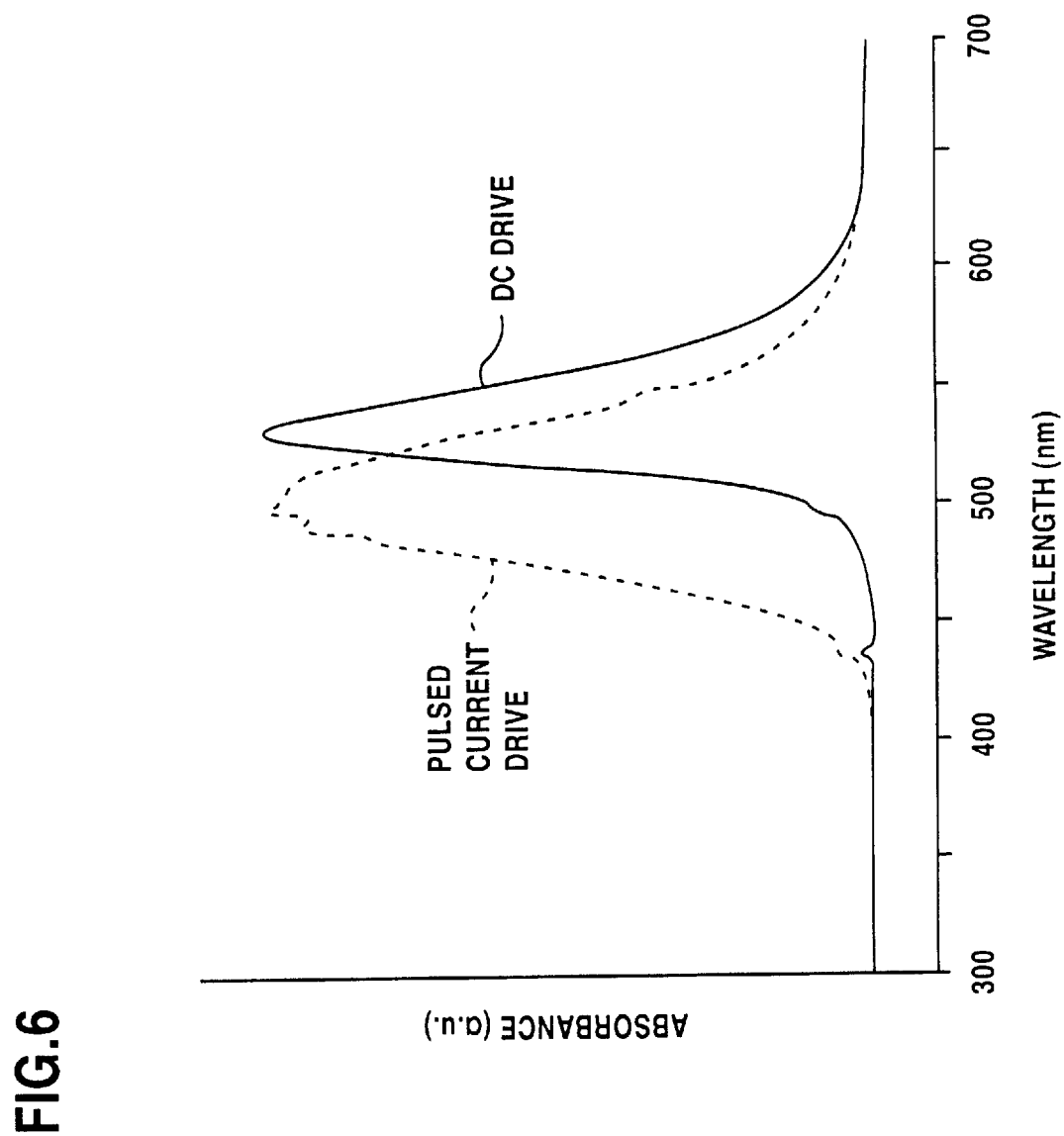
FIG. 6 shows an emission spectrum of the GaN-based LED when driven by the pulsed current and DC.

A commercially available GaN-based LED (quantum well type (active layer) structure; a green LED "NSPG 300A"

manufactured by Nichia chemical Ind., Ltd.) was then employed to measure its emission spectrum when pulse driven. The results are shown in FIG. 6. The pulse drive was effected at a frequency of 2 kHz, a duty ratio of 1/20 and a peak current of 400 mA. As apparent from FIG. 6, a peak appears around 350 nm in the emission spectrum when the LED was pulse driven, and the peak is observed to shift to around 500 nm in the emission spectrum when the LED was DC driven. This indicates the ability of the LED to emit, when pulse driven, a light having a wavelength different from that of an emitting light when DC driven.

Next, a sample was prepared using a diarylethene-group photochromic material as represented by the following structural formula (2).

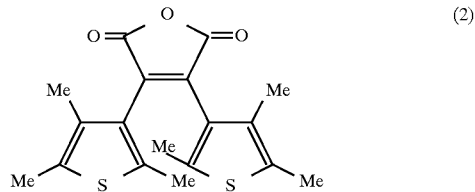
(2)

The sample was prepared in the same manner as described above in conjunction with the compound represented by the formula (1), i.e., by adding 1 weight % of the photochromic material to polystyrene, dissolving the mixture in toluene, and casting the resulting solution on a glass disk to form a thin film. This photochromic material is a photochromic material which experiences a coloring reaction upon irradiation with a light in a wavelength range of 400 nm–500 nm.

Figure 7:
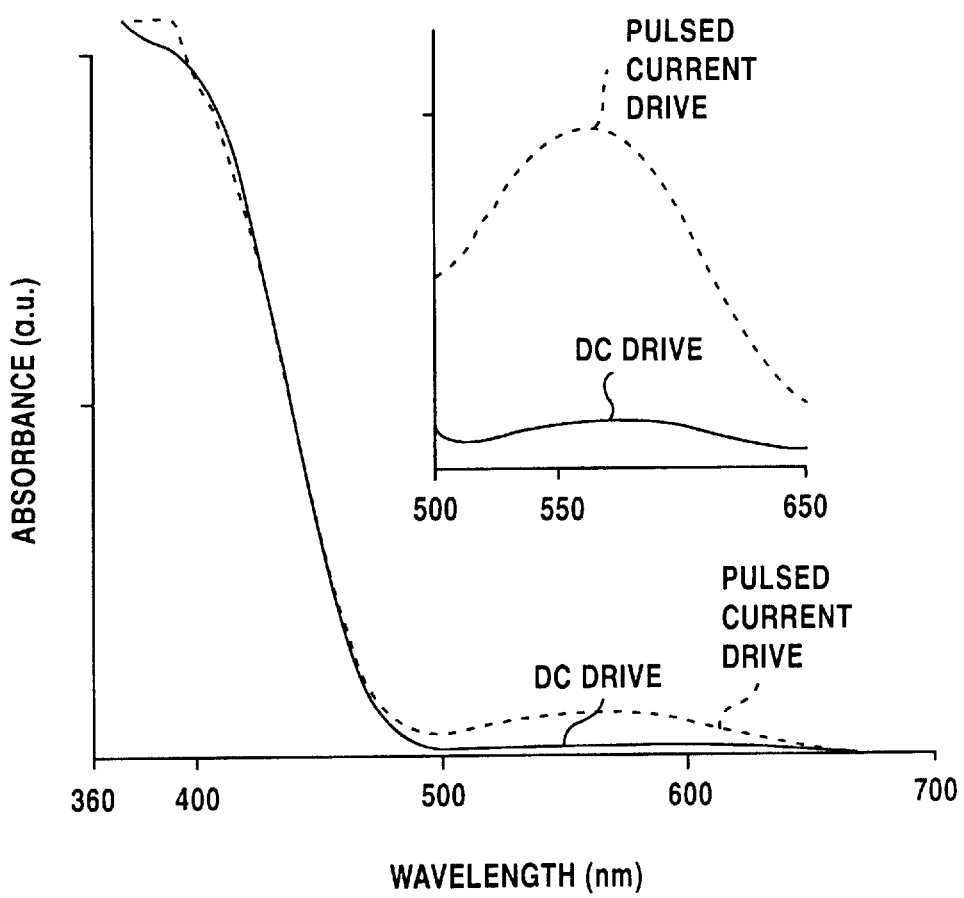
FIG. 7 shows an absorption spectrum of one exemplary photochromic material after irradiated with the pulse- and DC-driven LED.

FIG. 7 shows an absorption spectrum of the above sample when irradiated with respective lights emitted from the GaN-based LED (NSPG 300A) when pulse driven and when DC driven. The absorption spectrum portion in a wavelength range of 500 nm–650 nm is also given in an enlarged manner in FIG. 7. The pulse and DC drive conditions were analogous to those employed in obtaining the spectrum of FIG. 6. It may be appreciated from FIG. 6 that the pulse drive causes the coloring reaction of the sample while the DC drive causes the discoloring reaction thereof.

Then, another sample was prepared using a diarylethene-group photochromic material as represented by the following structural formula (3) in the same manner as described above to measure an absorption spectrum of the sample when irradiated with the light emitted from the pulse driven LED. This photochromic material also exhibits a coloring reaction upon irradiation with a light in a wavelength range of 400 nm–500 nm. For comparative purposes, an absorption spectrum of the sample when irradiated with a light emitted from the DC driven LED was also measured.

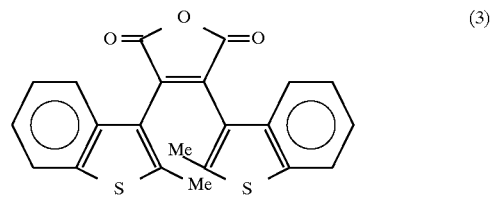
(3)

Figure 8:
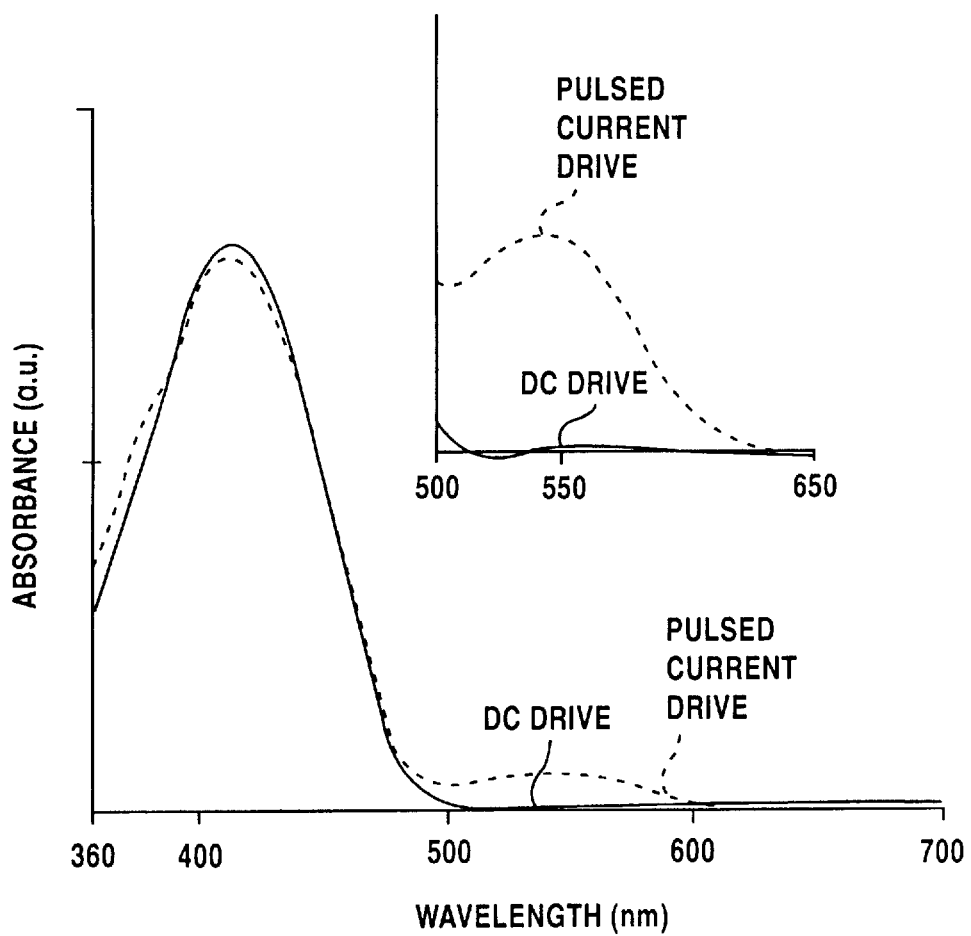
FIG. 8 shows an absorption spectrum of another exemplary photochromic material when irradiated with the pulse- and DC-driven LED.

FIG. 8 is the absorption spectrum as showing the results. Again, the absorption spectrum portion in a wavelength range of 500 nm–650 nm is separately given in an enlarged manner in FIG. 8. As apparent from FIG. 8, the pulse drive causes the coloring reaction of the sample and the subsequent DC drive causes the discoloring reaction thereof.

The diarylethene-group photochromic material having a structural formula as represented by the formula (1) was employed to prepare an optical recording medium having the phtochromic material serving as a masking layer.

Figure 9:
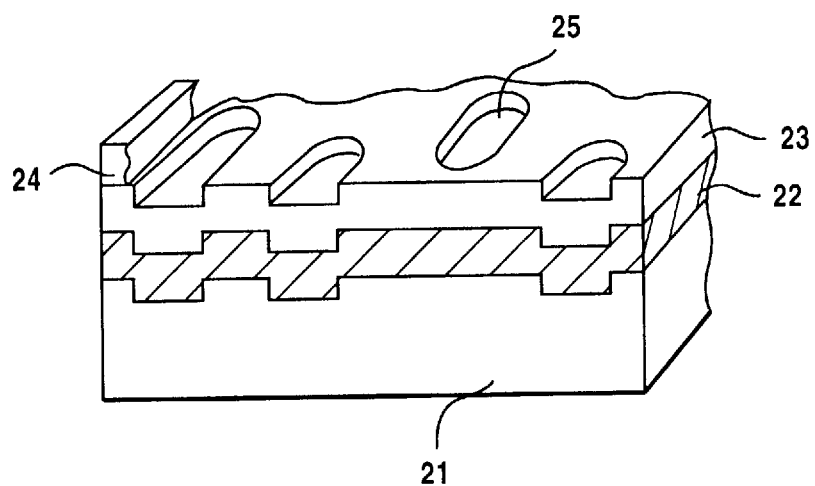
FIG. 9 is a partly cut-away perspective view illustrating the structure of the optical recording medium as employed in one embodiment in accordance with the present invention.

FIG. 9 is a partly cut-away perspective view illustrating the optical recording medium construction. The illustrated optical recording medium is a reproduce only optical recording medium such as a CD which utilizes a pit recording mode. Referring now to FIG. 9, provided onto a polycarbonate substrate 21 having a thickness of about 1.2 mm is a masking layer 22 containing the above photochromic material. A high density recording of EFM signals with the shortest pit of 0.45 $\mu$m and a track pitch of 0.85 $\mu$m was made on a surface of the polycarbonate substrate 21. The above-identified diarylethene-group compound was formed into a thin film masking layer 22 by means of a vacuum deposition technique. The film thickness was 1 $\mu$m. Disposed on the masking layer 22 is a reflecting layer (recording layer) 23 comprised of the vacuum deposited Ag. A protective layer 24 comprised of an UV-curable resin is provided on the reflecting layer 23.

A reproducing beam which enters and passes through the substrate 21 is reflected by the reflecting layer 23 wherein the pits 25 formed in the reflecting layer are read out as a recording information. In this particular embodiment, a red laser beam is employed as the reproducing beam. The masking layer 22 is subjected to the discoloring reaction upon irradiation with the red laser beam serving as the reproducing beam. The masking layer 22 is colored upon irradiation with the ultraviolet light.

Figure 1:
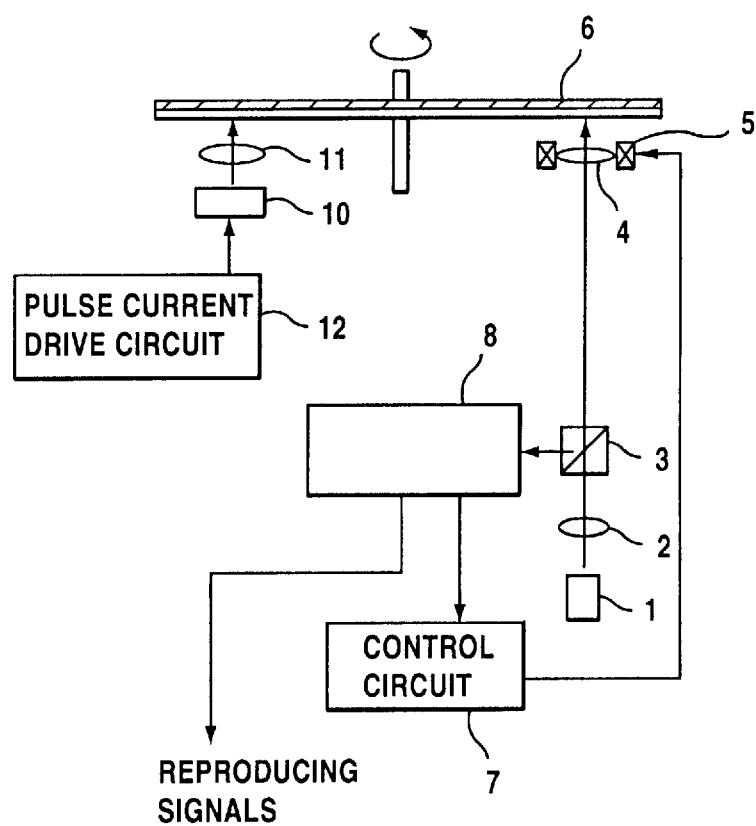
FIG. 1 is a schematic block diagram illustrating one embodiment of the reproducing apparatus for reproducing information stored in the optical recording medium in accordance with the present invention.

The reproducing apparatus of the construction as illustrated in FIG. 1 was employed to reproduce information stored in the above-described optical recording medium. With reference to FIG. 1, a semiconductor laser source 1 for a 635 nm light emission is provided as a reproducing beam source. The semiconductor laser source 1 is driven by a constant current at 1 mA to emit reproducing beam. Arranged in front of the reproducing beam source 1 are a collimating lens 2 for tailoring the emitting beam and a half-silvered mirror 3 such that the reproducing beam passing through the half-silvered mirror 3 is focused upon the optical recording medium 6 through an objective lens 4 having a numerical aperture of 0.55. An objective lens control mechanism 5 is provided to control the focusing and tracking actions of the objective lens 4. In order to effect such a control, control signals are transmitted from a control circuit 7 to the objective lens control mechanism 5.

The light reflected by the optical recording medium 6 passes through the objective lens 4 and is then reflected by the half-silvered mirror 3 to be directed to an optical system 8 for detecting servo signals. As the optical system reads out the reproducing signals by detecting the reflected light, it transmits tracking servo signals and focusing servo signals to the control circuit 7 which sequentially sends control signals to the objective lens control mechanism 5. Here, a push-pull mode was adopted for the tracking servo system and an astigmatic mode for the focusing servo system.

In the reproduction of the optical recording medium as illustrated in FIG. 9, the masking layer 22 is made colored prior to illumination with the reproducing beam. As the reproducing beam impinges upon the colored masking layer 22, the discoloring reaction is caused in a portion of the reproducing beam spot area through which the reproducing beam passes to reach the reflecting layer 23. This allows the reproduction in an effective spot having a radius smaller than that of the reproducing beam spot. The super resolution effect can be thus obtained. As such, the masking layer containing the photochromic material must be maintained in its colored state prior to the reproduction. To this end, the reproducing apparatus of FIG. 1 has a light emitting device 10 comprised of the GaN-based LED (NLPB500) as a coloring light source. Another objective lens 11 is provided in front of the light emitting device 10 for gathering the coloring light emitted from the light emitting device 10 and directing it onto the optical recording medium 6. A pulse current drive circuit 12 is coupled to the light emitting device 10 for driving the light emitting device 10 by application of the pulsed current thereto.

The reproducing apparatus of FIG. 1 utilizes the ultraviolet light emitted from the pulse driven light emitting device 10 for coloring the masking layer of the optical recording medium 6. The light emitting device 10 and the semiconductor laser source 1 are moved in synchronism with each other so that the reproducing beam from the semiconductor laser source 1 sweeps over the masking layer area which has been colored by the coloring light from the light emitting device 10.

The reproduction of the optical recording medium 6 was effected using the reproducing apparatus as described with reference to FIG. 1. The pulsed current with a frequency of 20 kHz, a duty ratio of 1/100 and a peak current of 2 A was employed to drive the light emitting device 10 as the coloring light source. The size of the coloring light spot on a reflecting surface of the optical recording medium is about 1 mm in the length direction of the recording track. A relative speed in motion between the coloring light spot and the optical recording medium is 5 mm/sec. Accordingly, the corresponding frequency as given by a ratio of the relative speed to the radius of the coloring light spot is 5 kHz.

In accordance with the manner as described above, the optical recording medium was irradiated with the coloring light emitted from the light emitting device 10 when pulse driven, and subsequently illuminated with the reproducing beam from the semiconductor laser source 1 for reproducing information stored in the optical recording medium. The eye pattern observation of 3T signals was 60%. Also, a uniform coloring of the masking layer upon irradiation with the coloring light was observed.

For comparative purposes, the reproducing procedure was repeated in the same manner as described above except that the light emitting device 10 was driven by the constant current at 30 mA to provide an emitting light to be irradiated. No coloring of the masking layer was observed. Accordingly, the super resolution effect was not noticed. The eye pattern observation of 3T signals was 35%.

As can be understood from the above description, in accordance with the present invention, the pulse drive is utilized to cause the light emitting device to emit a light having a wavelength different from that of a light emitted from the light emitting device when driven by the constant current. Such an emitting light can be used as the light for coloring the photochromic masking layer.

The above embodiment is described by way of an example using the reproduce only high density CD as the optical recording medium. However, the optical recording medium of the present invention is not limited to such, but is also applicable to magneto-optical recording media, rewritable optical recording media such as phase change type media, write once optical recording media. It is further applicable to optical recording media using the photochromic material as the recording layer.

Figure 10:
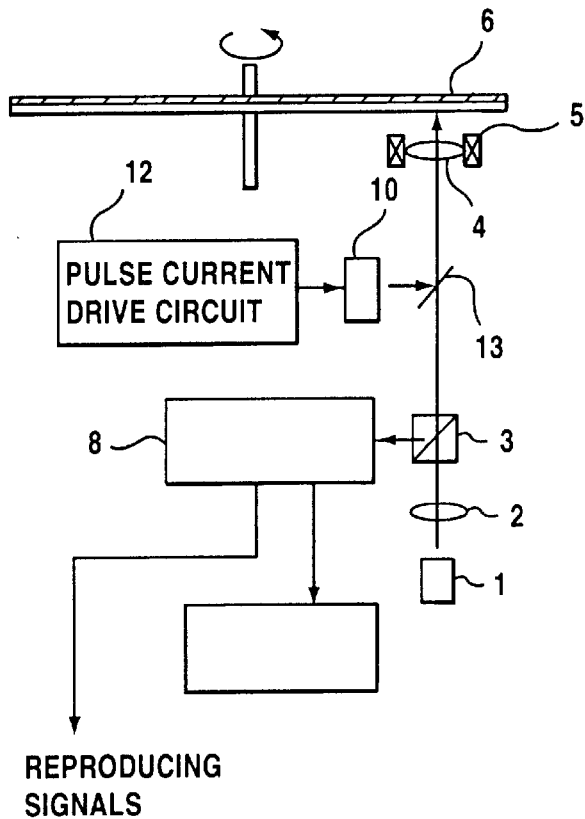
FIG. 10 is a schematic block diagram illustrating another embodiment of the reproducing apparatus for reproducing information stored in the optical recording medium in accordance with the present invention.

In the reproducing apparatus as illustrated in FIG. 1, the coloring light and the reproducing beam are gathered and directed onto the optical recording medium through separately arranged, respective optical systems. However, the LED can be incorporated in a reproducing pickup to allow a single objective lens to gather and direct the coloring light and the reproducing beam. FIG. 10 is a schematic block diagram showing the reproducing apparatus having such a construction. Referring to FIG. 10, a half-silvered mirror 13 is placed on an optical path of a reproducing beam from the semiconductor laser source 1. The light emitting device 10 as the coloring light source is arranged such that the coloring light emitted therefrom is reflected by the half-silvered mirror 13 which directs the light to the objective lens 4. The pulsed current drive circuit 12 is provided to supply the pulsed current to the light emitting device 10.

Although the optical recording medium is illustrated as an example of the optical device in the above embodiment, the optical device of the present invention is not limited to such an optical recording medium, but is applicable to a broad range of optical devices including optical switches utilizing a photon mode reaction and light modulators.

Figure 11:
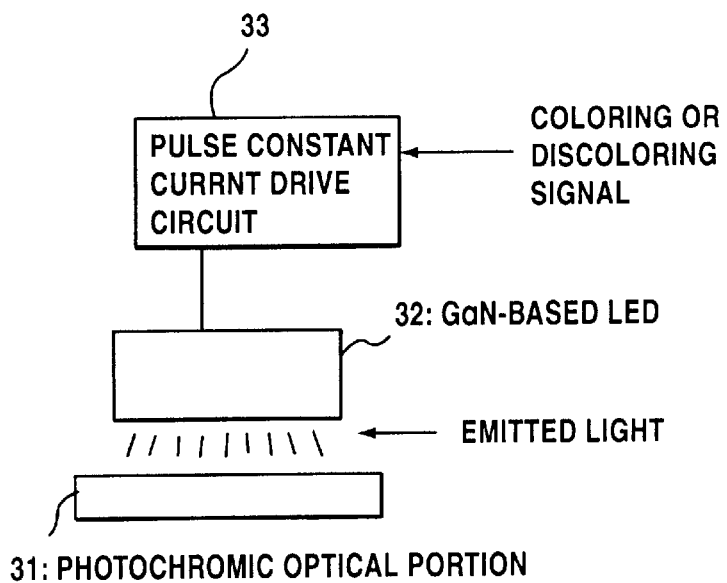
FIG. 11 is a schematic block diagram showing the optical control device in accordance with the present invention.

FIG. 11 is a schematic block diagram illustrating one embodiment of the optical control device in accordance with the present invention. A photochromic optical portion 31 includes a photochromic material capable of reversibly changing its state through a photon mode reaction. A GaN-based LED (NLPB500) 32 is such positioned as to emit a light toward the phtochromic optical portion 31. As illustrated in FIG. 2, the GaN-based LED 32 emits a blue light having a broad peak around 450 nm when driven by the constant current at several tens mA, and emits an ultraviolet light having a sharp peak around 380 nm when driven by the pulsed current greater in magnitude than a rated current. Coupled to the GaN-based LED 32 is a pulse-constant current drive circuit 33 which selectively supplies either of the pulsed current and the constant current. The switching between these current supply modes in the pulse-constant current drive circuit 33 is responsive to a coloring or discoloring signal from external.

The photochromic optical portion 31 includes the diarylethene-group photochromic material such as represented by the formula (1). Accordingly, as the drive circuit 33 applies the pulsed current to the GaN-based LED 32, the pulse driven GaN-based LED emits the ultraviolet light for coloring the photochromic optical portion 31.

On the other hand, when the drive circuit 33 applies the constant current to the GaN-based LED 32, the constant current driven LED 32 emits a blue light having a broad peak around 450 nm. Upon irradiation with the blue light, the photochromic optical portion 31 changes from the colored state to the bleached state through the photon mode reaction.

As described above, as the coloring signal is sent to the drive circuit 33 from external, the drive circuit 33 is operated to supply the pulsed current to the GaN-based LED 32 for coloring the photochromic optical portion 31. As the discoloring signal is subsequently transmitted to the drive circuit 33 from external, the drive circuit 33 is switched to supply the constant current to the GaN-based LED 32 which now emits the blue light. Upon irradiation with the blue light, the photochromic optical portion 31 is discolored.

In the manner as described above, the optical control device is capable of selectively coloring or discoloring the photochromic optical portion 31 responsive to the given signal from external.

Figure 12:
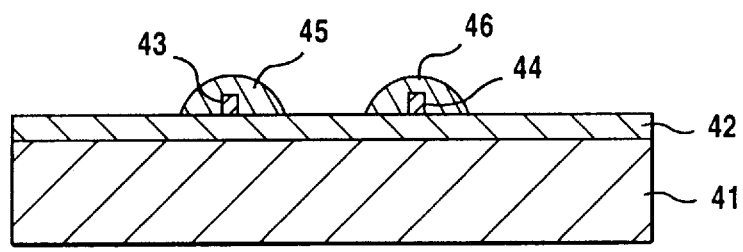
FIG. 12 is a cross-sectional view showing an example of an optical device as the optical control device in accordance with the present invention.
Figure 13:
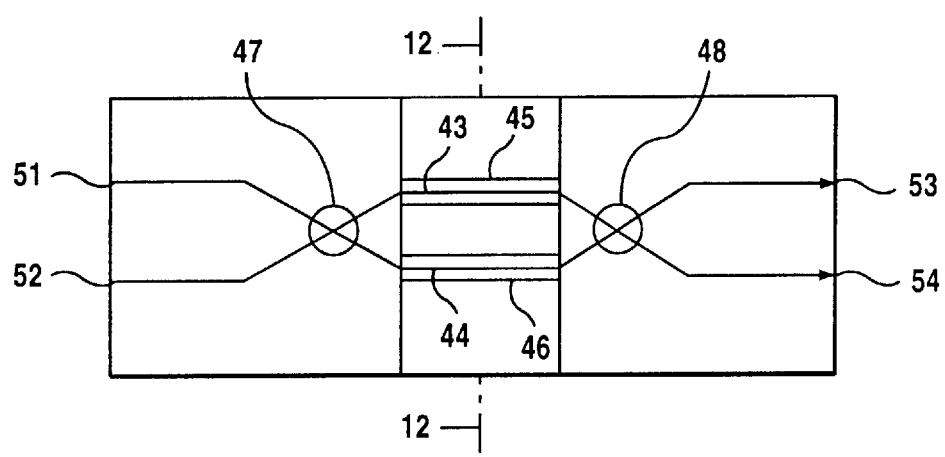
FIG. 13 is a plan view showing the optical device example as the optical control device in accordance with the present invention.

FIGS. 12 and 13 are a cross-sectional view and a plan view, respectively, illustrating an optical switch as one embodiment of the optical control device in accordance with the present invention. FIG. 12 is a cross-sectional view taken along the line A—A in FIG. 13. Referring now to FIGS. 12 and 13, the optical switch is of Mach-Zehnder type structure and includes a pair of 3 dB couplers 47, 48. The optical switch has on a silicon wafer 41 a cladding layer 42 comprised of $SiO_2$ which carries thereon a pair of cores 43, 44 respectively comprised of $SiO_2$—$TiO_2$. The cladding layer 42 is formed by sputtering. Each of the cores comprised of $SiO_2$—$TiO_2$ is formed by sputtering thereof to form a thin film which is subsequently subjected to a reactive etching in a patterned manner. The core is configured to have a 8×8 $\mu$m section.

As illustrated in FIGS. 12 and 13, a pair of longitudinally extending polymer clads 45, 46 are provided in a central section of the optical switch to cover respective coextensive portions of the cores 43, 44. Each of the cores 43, 44 has opposite ends which extend in opposite directions outwardly from the central section of the optical switch to enter respective side sections which flank the central section therebetween. The core portions located in the opposite side sections are buried in respective $SiO_2$ cladding layers (not shown) additionally provided on the cladding layer 42. As shown in FIG. 13, one end of the core 43 extends through a 3 dB coupler 47 to an input port 52 for connection therewith, and another end of the core 43 through another 3 dB coupler 48 to an output port 54 for connection therewith. Analogously, one end of the core 44 extends through the 3 dB coupler 47 to an input port 51 for connection therewith, another end thereof through the 3 dB coupler 48 to the output port 53 for connection therewith. The 3 dB coupler 47 allows the selective communication of each of the cores 43, 44 with the input ports 51, 52. The 3 dB coupler 48 allows the selective communication of each of the cores 43, 44 with the output ports 53, 54.

The core of the above optical switch is designed to have a refractive index 0.3% greater than the clad. Employed as the polymer clads 45, 46 is poly(trifluoroethyl methacrylate-methyl methacrylate)(P3FMA-MMA) which has been copolymerized at such controlled proportions of monomer units as to have the index of refraction comparable to the $SiO_2$ clad. This polymer has the index of refraction of 1.523 at 633 nm. The polymer is dissolved in methylisobutyl ketone, followed by casting thereof to form the polymer clads 45, 46. In this particular embodiment, only one of the polymer clads 45, 46, i.e. the polymer clad 45 includes 12 weight % of the photochromic material as above represented by the formula (1). The polymer clads 43, 44 are spaced from each other by a distance of 1.2 mm.

The optical switch has a light emitting device such as GaN-based LED (not shown) for emitting light to irradiate the polymer clad 45 therewith. The GaN-based LED is connected to a drive circuit (not shown) such as illustrated in FIG. 11 for selectively supplying either the pulsed or constant current to the LED responsive to signals from external.

In the case that the polymer clad 45 including the photochromic material is in the bleached state to have the index of refraction equal to the polymer clad 46, the light transmitted through the core 43 is synchronized in phase with the light transmitted through the core 44 so that the 3 dB coupler 48 functions to couple these lights for transmitting thereof such as to the output port 54.

In the other case that the polymer clad 45 including the photochromic material is in the colored state to have the index of refraction not equal to the polymer clad 46, the phase of the light transmitted through the core 43 is shifted 180° from that of the light transmitted through the core 44 to produce a phase difference of 180°. In this instance, these lights coupled at the 3 dB coupler 48 interfere with each other to be sent such as to the output port 53.

As described above, the light entering from the port 51 or the port 52 is coupled to the 3 dB coupler which distributes the light into the cores 43 and 44. The 3 dB coupler 48 couples the lights from the cores 43 and 44 to send the coupled light to the port 53 or 54 depending upon the state of the polymer clad 45. Accordingly, the selective application of the pulsed or constant current in driving the LED that emits light for illuminating the polymer clad 45 produces changes in the index of refraction of the polymer clad 45 to result in switching of the output port. Such a switch state is maintained without necessity of power application from external.

In accordance with the above-described embodiment, the optical switch can be actuated using a small and costeffective LED. The optical switch is thus provided which utilizes a single light source and is low in size, cost and power consumption.

In the above embodiment, the optical control device of the present invention is illustrated as constituting the optical switch. However, the optical control device of the present invention is not limited to the optical switch, but is also applicable to the other types of optical control devices such as light modulators.

Also, the present invention is applicable to any device or process which utilizes the photochromism.

Furthermore, although the LED is illustrated as one preferred example of the light emitting device in the above embodiments, the other types of light emitting devices such as semiconductor lasers or the like can be also employed for the present invention.

What is claimed is:

1. A method for optically controlling an optical device comprising the steps of:
    providing a light emitting device which emits first light having a first wavelength when driven by a relatively higher pulsed current, and emits second light having a second wavelength, which is longer than the first wavelength when driven by a relatively lower constant current;
    driving said light emitting device by selectively applying the relatively higher pulsed current or relatively lower constant current thereto for causing the device to emit the first light or the second light; and
    irradiating said optical device with said first light or the second light to cause a reversible photochromic reaction therein.

2. The method of claim 1 wherein said optical device includes a photochromic material which is subjected to the reversible photochromic reaction upon said irradiation with one of the first light and second light.

3. The method of claim 1 wherein said reversible photochromic reaction is a photon mode reaction.

4. The method of claim 1 wherein said optical device is an optical recording medium.

5. The method of claim 4 wherein a photochromic material is included in a recording layer of said optical recording medium.

6. The method of claim 4 wherein said optical recording medium has a masking layer including a photochromic material, said masking layer being capable of reducing a spot radius of a reproducing beam impinged upon said optical recording medium for irradiation of the recording layer of the optical recording medium with the reduced spot.

7. The method of claim 4 wherein a spot of the emitting light from said light emitting device is moved relative to said optical recording medium for scanning a spot of the emitting light by a relative movement of the optical recording medium and the light emitting device.

8. The method of claim 7 wherein a frequency of the pulsed current for driving said light emitting device is higher than a frequency determined by a ratio of the relative speed of the optical recording medium to the spot radius of the emitting light.

9. The method of claim 1 wherein a duty ratio of the pulsed current for driving said light emitting device is not higher than 1/10.

10. The method of claim 1 wherein said light emitting device has an active layer comprising a compound containing at least nitrogen and gallium.

11. The method of claim 1 wherein the first light emitted from the light emitting device when driven by the pulsed current is ultraviolet light.

12. The method of claim 1 wherein said reversible photochromic reaction causes increase in absorption at a particular wavelength.

13. A reproducing apparatus for an optical recording medium having a photochromic material-containing layer that exhibits increase in absorption at a reproducing beam wavelength when irradiated with ultraviolet light, said reproducing apparatus comprising:
    a light emitting device, when driven by a pulsed current, for emitting said ultraviolet light to cause said photochromic material-containing layer to exhibit increase in absorption at the reproducing beam wavelength;
    means for supplying the pulsed current to said light emitting device;
    a reproducing beam source to emit a reproducing beam at the reproducing beam wavelength for reproducing information stored in the optical recording medium and for reducing the once increased absorption at the reproducing beam wavelength of the photochromic material-containing layer;
    means for gathering and focusing the reproducing beam emitted from said reproducing beam source upon the optical recording medium; and
    means for detecting said reproducing beam from the optical recording medium.

14. The reproducing apparatus of claim 13 wherein said photochromic material-containing layer constitutes a recording layer of said optical recording medium.

15. The reproducing apparatus of claim 13 wherein said photochromic material-containing layer constitutes a masking layer of said optical recording medium.

16. An optical control device comprising:
    an optical portion including a photochromic material reversibly changeable between a first state and a second state;
    a light emitting device to emit light for irradiation of said optical portion therewith, said light emitting device, when driven by a relatively higher pulsed current, emitting first light having a first wavelength and, when driven by a relatively lower constant current, emitting second light having a second wavelength which is longer than the first wavelength; and
    a driving means responsive to signals for selectively applying the pulsed current or the constant current to said light emitting device for driving thereof;

wherein the irradiation of said optical portion with the first light emitted from the light emitting device driven by said relatively higher pulsed current from said driving means causes the state change of the optical portion from the first state to the second state, and wherein the irradiation of said optical portion with the second light emitted from the light emitting device driven by said relatively lower constant current from said driving means causes the state change of the optical portion from the second state to the first state.

17. The optical control device of claim 16 wherein said first state is a bleached state of said photochromic material which exhibits a relatively smaller absorption at a particular wavelength and said second state is a colored state of said photochromic material which exhibits a relatively higher absorption at the particular wavelength.

18. The optical control device of claim 16 wherein a duty ratio of the pulsed current for driving the light emitting device is not higher than 1/10.

19. The optical control device of claim 16 wherein said light emitting device has an active layer comprising a compound containing at least nitrogen and gallium.

20. The optical control device of claim 16 wherein the light emitted from the light emitting device when driven by the pulsed current is ultraviolet light.

21. The optical control device of claim 16 wherein the optical control device constitutes an optical switch.

22. A method for optically controlling an optical device comprising the steps of:

providing a light emitting device which, when driven by a relatively higher pulsed current, emits first light having a wavelength different from that of second light emitted therefrom when driven by a relatively lower constant current;

driving said light emitting device by the relatively higher pulsed current for causing the device to emit the first or second light;

irradiating said optical device with said first or second light to cause a photochromic reaction therein;

wherein said optical device is an optical recording medium; and wherein said optical recording medium has a masking layer including a photochromic material, said masking layer being capable of reducing a spot radius of a reproducing beam impinged upon said optical recording medium for irradiation of the recording layer of the optical recording medium with the reduced spot.

23. A method for optically controlling an optical device comprising the steps of:

providing a light emitting device which, when driven by a relatively higher pulsed current, emits first light having a wavelength different from that of second light emitted therefrom when driven by a relatively lower constant current;

driving said light emitting device by the relatively higher pulsed current for causing the device to emit the first or second light;

irradiating said optical device with said first or second light to cause a photochromic reaction therein;

wherein said optical device is an optical recording medium;

wherein a spot of the emitting light from said light emitting device is moved relative to said optical recording medium for scanning a spot of the emitting light by a relative movement of the optical recording medium and the light emitting device; and wherein a frequency of the pulsed current for driving said light emitting device is higher than a frequency determined by a ratio of the relative speed of the optical recording medium to the spot radius of the emitting light.

24. A method for optically controlling an optical device comprising the steps of:

providing a light emitting device which, when driven by a relatively higher pulsed current, emits first light having a wavelength different from that of second light emitted therefrom when driven by a relatively lower constant current;

driving said light emitting device by the relatively higher pulsed current for causing the device to emit the first or second light;

irradiating said optical device with said first or second light to cause a photochromic reaction therein; and wherein a duty ratio of the pulsed current for driving said light emitting device is not higher than 1/10.

25. An optical control device comprising:

an optical portion including a photochromic material reversibly changeable between a first state and a second state;

a light emitting device to emit light for irradiation of said optical portion therewith, said light emitting device, when driven by a relatively higher pulsed current, emitting first light having a wavelength different from that of second light emitted therefrom when driven by a relatively lower constant current; and a driving means responsive to signals for selectively applying the pulsed current or the constant current to said light emitting device for driving thereof;

wherein the irradiation of said optical portion with the first light emitted from the light emitting device driven by said relatively higher pulsed current from said driving means causes the state change of the optical portion from the first state to the second state, and wherein the irradiation of said optical portion with the second light emitted from the light emitting device driven by said relatively lower constant current from said driving means causes the state change of the optical portion from the second state to the first state; and wherein a duty ratio of the pulsed current for driving the light emitting device is not higher than 1/10.

* * * * *